US010367323B2

(12) United States Patent
Lin

(10) Patent No.: US 10,367,323 B2
(45) Date of Patent: Jul. 30, 2019

(54) CRIMPING HAND TOOL

(71) Applicant: JETOOL CORP., New Taipei (TW)

(72) Inventor: Kai-Yen Lin, New Taipei (TW)

(73) Assignee: JETOOL CORP., New Taipei (TW)

( * ) Notice: Subject to any disclaimer, the term of this patent is extended or adjusted under 35 U.S.C. 154(b) by 169 days.

(21) Appl. No.: 15/605,922

(22) Filed: May 25, 2017

(65) Prior Publication Data

US 2018/0062337 A1 Mar. 1, 2018

Related U.S. Application Data

(60) Provisional application No. 62/378,690, filed on Aug. 24, 2016.

(30) Foreign Application Priority Data

Apr. 6, 2017 (TW) ............................ 106111500 A

(51) Int. Cl.

| | |
|---|---|
| ***B23P 19/00*** | (2006.01) |
| ***H01R 43/042*** | (2006.01) |
| *H01R 9/05* | (2006.01) |
| *H01R 43/048* | (2006.01) |

(52) U.S. Cl.

CPC ....... *H01R 43/0425* (2013.01); *H01R 9/0518* (2013.01); *H01R 43/0488* (2013.01); *Y10T 29/53226* (2015.01)

(58) Field of Classification Search

CPC .............. H01R 43/0425; H01R 43/042; H01R 43/0488; H01R 9/0518; Y10T 29/53127; Y10T 29/53226

USPC .................................................... 29/749, 751

See application file for complete search history.

(56) References Cited

U.S. PATENT DOCUMENTS 5,647,119 A * 7/1997 Bourbeau ............ H01R 43/042 29/751
7,096,573 B2 * 8/2006 Holliday ................. B25B 27/10 29/751
8,359,736 B2 * 1/2013 Lu ...................... H01R 43/0425 29/751

* cited by examiner

*Primary Examiner* — Donghai D Nguyen
(74) *Attorney, Agent, or Firm* — JCIPRNET

(57) ABSTRACT

A crimping hand tool used for crimping a coaxial cable and a coaxial terminal together is provided. The crimping hand tool includes a first body, a second body pivoted to the first body, a first linking body having a first end pivoted to the second body and a second end, a second linking body having a third end pivoted to the first body and a fourth end, a third linking body having a fifth end and a sixth end, a moving assembly, and a crimping assembly, wherein the second, the fourth, and the sixth ends are pivoted coaxially. The moving assembly is pivoted to the fifth end and slidably coupled to the first body along an axial direction. The crimping assembly is disposed on and moves along with the moving assembly to crimp the coaxial cable and the coaxial terminal together.

9 Claims, 6 Drawing Sheets

CRIMPING HAND TOOL

CROSS-REFERENCE TO RELATED APPLICATION

This application claims the priority benefits of U.S. provisional application Ser. No. 62/378,690, filed on Aug. 24, 2016 and Taiwan application serial no. 106111500, filed on Apr. 6, 2017. The entirety of each of the above-mentioned patent applications is hereby incorporated by reference herein and made a part of this specification.

BACKGROUND

Technical Field

The disclosure relates to a crimping hand tool.

Description of Related Art

A coaxial cable is so named because the two types of conductors within the coaxial cable shares a central axis. Coaxial cables are often used in signal transmissions, cable television systems, etc. Coaxial cables have a wide range of uses. Therefore, how to crimp a coaxial terminal and a coaxial cable together is an important topic.

However, with coaxial terminals currently having different specifications (such as different lengths), the effect of altering crimping specifications is achieved by pulling a crimping portion out of crimping pliers, and then changing a crimping position of the crimping portion, and thereafter placing the crimping portion back on the crimping pliers. However, actions requiring replacement, such as pulling out and then placing back to the crimping pliers, not only cause inconvenience of use, but there may also be a risk of losing the crimping portion.

SUMMARY

The disclosure provides a crimping hand tool, which is driven through a toggle joint and is suitable for coaxial terminals with different specifications.

The crimping hand tool of the disclosure is used for crimping a coaxial cable to a coaxial terminal. The crimping hand tool includes a first body, a second body, a first linking body, a second linking body, a third linking body, a moving assembly, and a crimping assembly. The second body is pivoted to the first body. The first linking body has a first end and a second end, the first end being pivoted to the second body. The second linking body has a third end and a fourth end, the third end being pivoted to the first body. The third linking body having a fifth end and a sixth end. The second end, the fourth end, and the sixth end are pivoted coaxially. The moving assembly is pivoted to the fifth end and slidably coupled to the first body along an axial direction. The crimping assembly is disposed on and moves along with the moving assembly. The first body and the second body are forced and pivoted to each other, and slide the moving assembly along the axial direction through the first linking body, the second linking body, and the third linking body, such that the moving assembly drives the crimping assembly to crimp the coaxial cable and the coaxial terminal together.

In an embodiment of the disclosure, the first linking body and the second linking body are respectively a toggle joint structure, the toggle joint structure of the first linking body being pivoted to the third linking body, the toggle joint structure of the second linking body being pivoted to the first linking body.

In an embodiment of the disclosure, the crimping hand tool further includes a first pivoting shaft and a first return spring. The first pivoting shaft is pivoted to the second linking body and the first body, and the first pivoting shaft is located in the toggle joint structure of the second linking body. The first return spring is connected between the moving assembly and the first pivoting shaft, the first return spring constantly driving the first body and the second body to be oppositely opened.

In an embodiment of the disclosure, the first body includes a base, a pair of side plates, and a handle. The side plates are assembled at two opposite sides of the base. The handle is assembled at the side plates and forms an accommodating space to accommodate at least a portion of the first linking body, at least a portion of the second linking body, at least a portion of the third linking body, and at least a portion of the moving assembly.

In an embodiment of the disclosure, the crimping hand tool further includes a gripping stopper disposed at the base. The base has a crimping space, the gripping stopper and the crimping assembly being located at two opposite sides of the crimping space along the axial direction. A gripping portion of the coaxial terminal is used for being gripped and stopped at the gripping stopper, such that a fixing portion of the coaxial terminal abuts on the crimping assembly. The crimping assembly is driven by the moving assembly to crimp a portion of the gripping portion into the fixing portion along the axial direction, such that the gripping portion grips and fixes one end of the coaxial cable in the fixing portion.

In an embodiment of the disclosure, the gripping stopper includes a stopping portion, a pair of components, and a second return spring. The components are assembled at the stopping portion to be opened or closed, the gripping portion is used for being gripped between the components and abutted against the stopping portion. The second return spring is connected between the components, the second return spring constantly drives the components to be closed to grip the gripping portion.

In an embodiment of the disclosure, the side plates respectively have expanding holes, the moving assembly includes a main body and a second pivoting shaft, the second pivoting shaft passing through the main body, and the two opposite ends thereof are slidably pivoted to the pair of expanding holes, an extending direction of each of the expanding holes being consistent with the axial direction.

In an embodiment of the disclosure, the side plates respectively further have protruding blocks being opposite each other as the side plates are assembled at the base, the main body movably bearing on the protruding blocks along the axial direction.

In an embodiment of the disclosure, the crimping assembly includes a crimping head and a nut. The crimping head has a crimping portion and a screw, the screw being used for locking in the moving assembly. The nut is movably sleeved to the screw and located between the crimping portion and the moving assembly, the nut being used for adjusting a distance of the crimping portion relative to the moving assembly.

In an embodiment of the disclosure, the second body has a locking groove, the locking groove having different inner diameters, while the crimping hand tool further has a locking shaft movably passing through the first body, the locking shaft having different outer diameters, and the locking shaft moves in the locking groove along with opposite opening and closing of the first body and the second body. When the first body and the second body open or close, the locking shaft is enabled to interfere at the locking groove to maintain an opened state or a closed state of the first body and the second body.

Accordingly, the crimping hand tool, through the first linking body, the second linking body, and the third linking body which are pivoted coaxially, in coordination with corresponding pivoting relationship of the first body and the second body, thus forms a toggle joint linkage structure, thereby enabling the moving assembly connected to the third linking body to be driven due to the toggle joint linkage structure, so as to enable the crimping assembly disposed on the moving assembly to be driven to perform the crimping action, facilitating the coaxial cable and the coaxial terminal to be crimped together.

To make the above and other features and advantages of the disclosure more comprehensible, embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
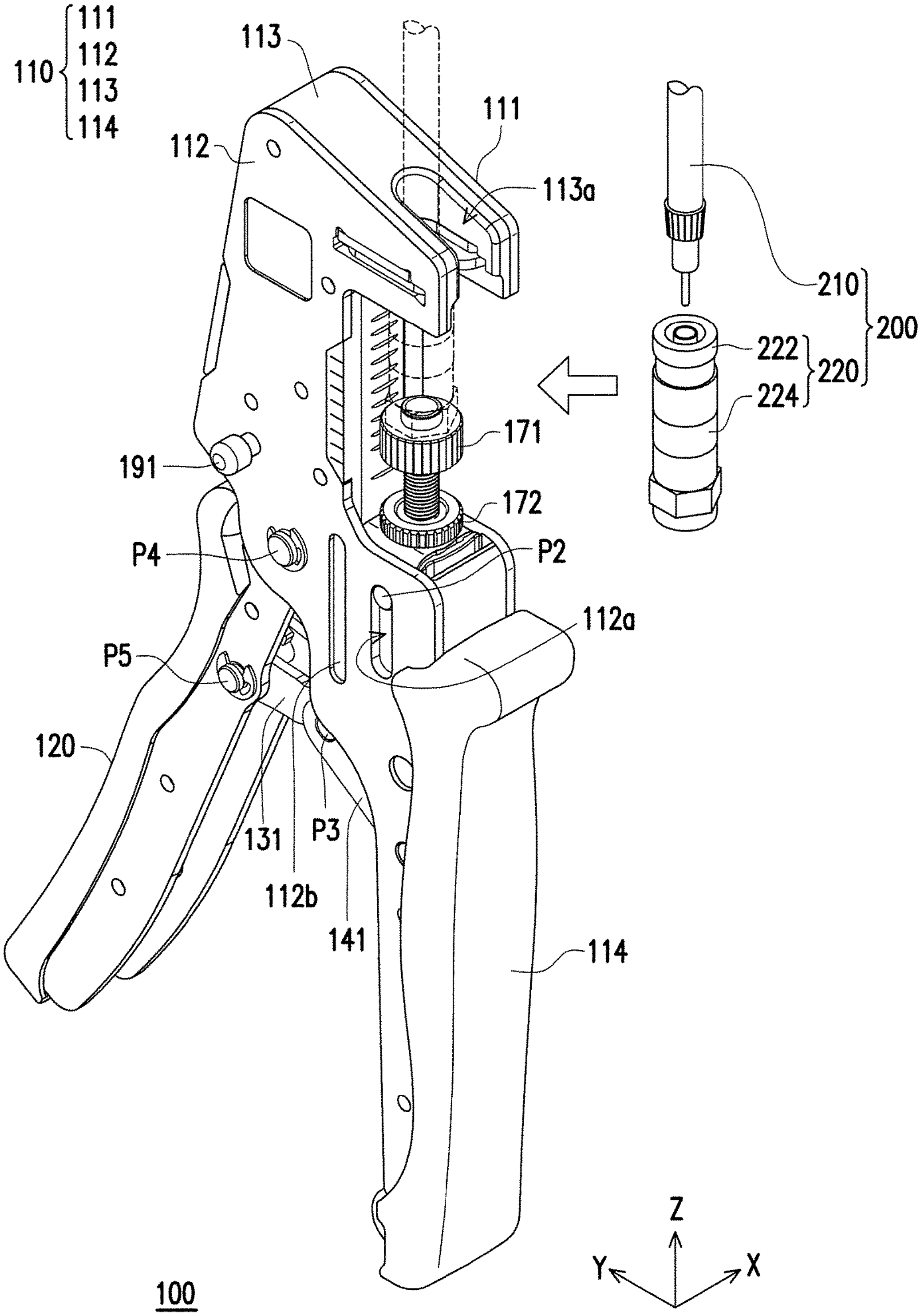
FIG. 1 is a schematic diagram of a crimping hand tool according to an embodiment of the disclosure.
Figure 2:
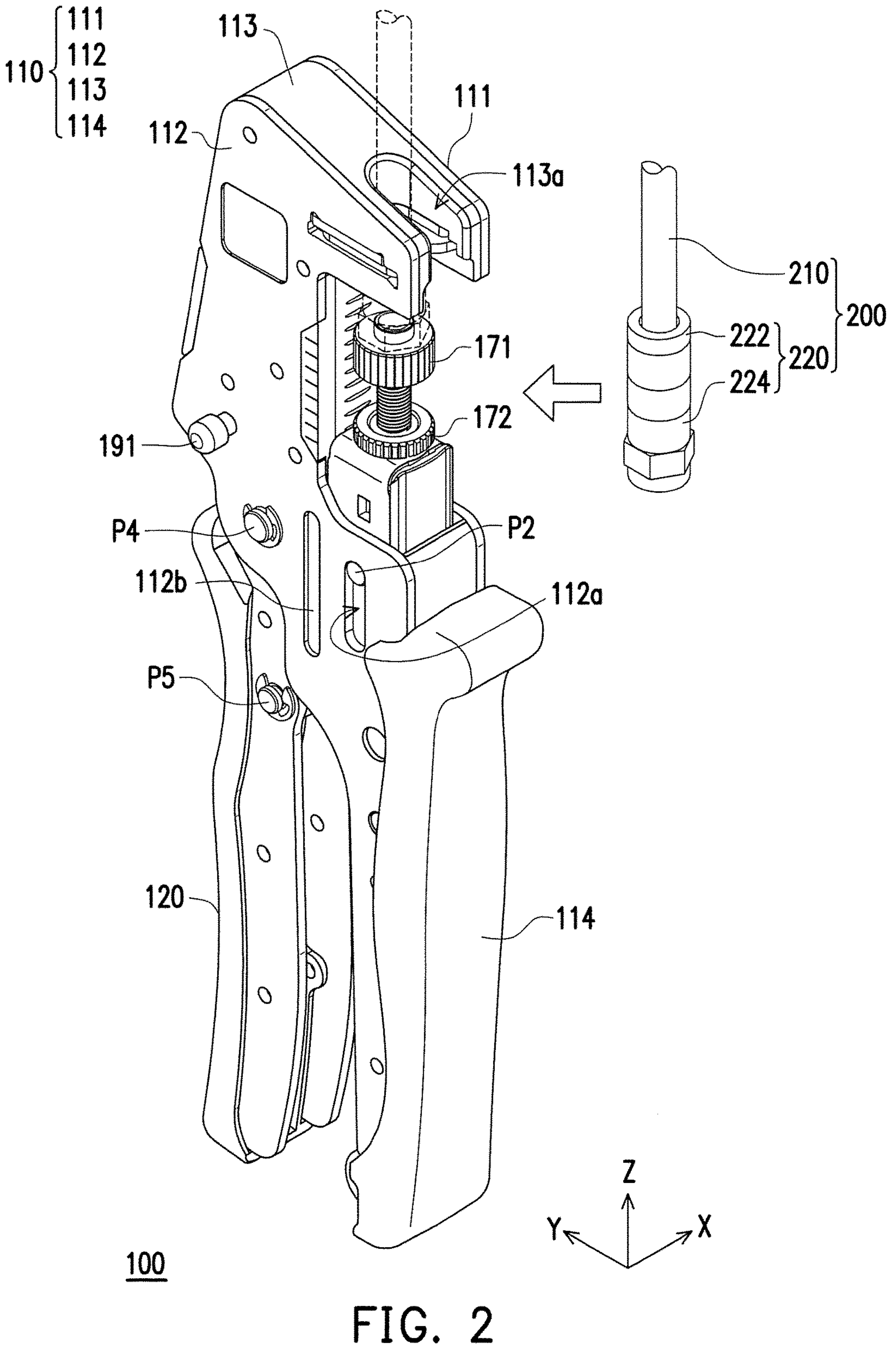
FIG. 2 is a schematic diagram of the crimping hand tool of FIG. 1 at another state.

FIG. 1 is a schematic diagram of a crimping hand tool according to an embodiment of the disclosure. FIG. 2 is a schematic diagram of the crimping hand tool of FIG. 1 at another state. Referring to FIG. 1 and FIG. 2 at the same time, in the embodiment, a crimping hand tool 100 is used for crimping a coaxial cable 210 and a coaxial terminal 220 together to form a cable connector 200.

Figure 3:
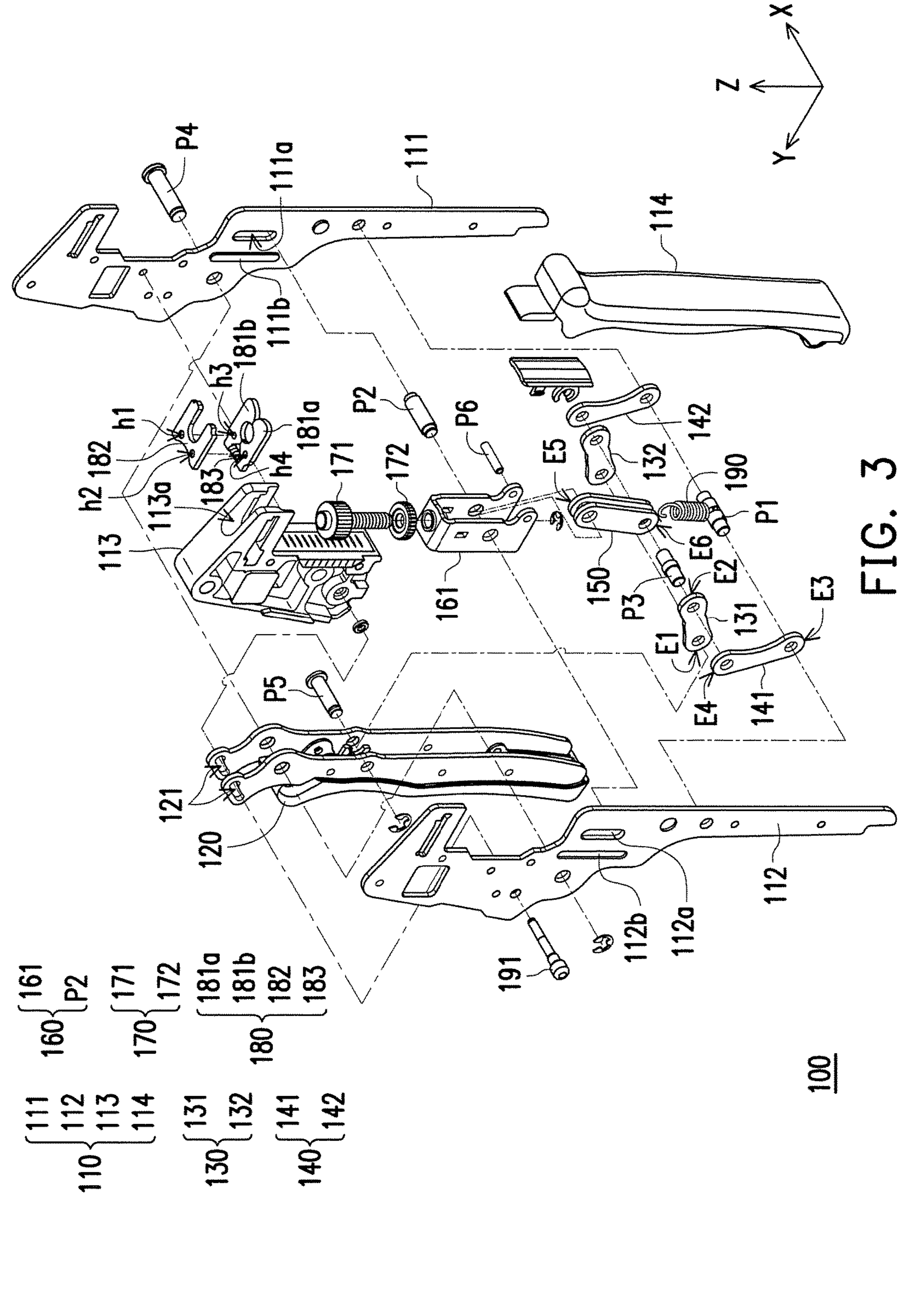
FIG. 3 is an explosive view of the crimping hand tool of FIG. 1.

FIG. 3 is an explosive view of the crimping hand tool of FIG. 1. Referring to FIG. 1 to FIG. 3 at the same time, a Cartesian coordinate X-Y-Z is provided herein to facilitate description of members. The crimping hand tool 100 includes a first body 110, a second body 120, a first linking body 130, a second linking body 140, a third linking body 150, a moving assembly 160, and a crimping assembly 170, wherein the second body 120 is pivoted to the first body 110. The first linking body 130 has a first end E1 and a second end E2 opposite to each other, the first end E1 being pivoted to the second body 120. The second linking body 140 has a third end E3 and a fourth end E4 opposite to each other, the third end E3 being pivoted to the first body 110. The third linking body 150 has a fifth end E5 and a sixth end E6 opposite to each other, and the second end E2, the fourth end E4, and the sixth end E6 are pivoted coaxially. The moving assembly 160 is pivoted to the fifth end E5 and slidably coupled to the first body 110 along an axial direction (Z-axis). The crimping assembly 170 is disposed on and moves along with the moving assembly 160.

As shown in FIG. 1, the coaxial terminal 220 includes a gripping portion 222 and a fixing portion 224, and the gripping portion 222 is movably sleeved in the fixing portion 224 along the axial direction (Z-axis). A user first temporarily places a front end of the coaxial cable 210 into the gripping portion 222, and places the coaxial cable 210 and the coaxial terminal 220 in such a temporary state together into a crimping space 113*a* of the first body 110, such that the fixing portion 224 abuts on a crimping head 171. Thereafter, the user holds the second body 120 and a handle 114 of the first body 110 and applies force to enable the first body 110 and the second body 120 to be pivoted to each other (namely, with X-axis in the drawing as a pivoting axis thereof), and slides the moving assembly 160 along the Z-axis through the first linking body 130, the second linking body 140, and the third linking body 150, so that the moving assembly 160 drives the crimping assembly 170 to push the fixing portion 224 upward, so that the gripping portion 222 is sleeved to the fixing portion 224 (as shown in FIG. 2), such that the coaxial cable 210 is crimped to the fixing portion 224 and electrically connected thereto, thereby the cable connector 200 is able to externally connect to other electronic devices through the fixing portion 224 (viewed as a terminal end).

More specifically, referring to FIG. 3 again, the first body 110 includes a base 113, a pair of side plates 111, 112, and the handle 114, wherein the side plates 111, 112 are assembled at two opposite sides of the base 113, the handle 114 is assembled at the side plates 111, 112 and forms an accommodating space to accommodate at least a portion of the first linking body 130, at least a portion of the second linking body 140, at least a portion of the third linking body 150, and at least a portion of the moving assembly 160. As shown in FIG. 3, the side plates 111, 112 are pivoted to the second body 120 through a pivoting component P4, such that the base 113 and the handle 114 are grippingly assembled between the side plates 111, 112. Meanwhile, the base 113 is further fixed between the side plates 111, 112 through a locking shaft 191. Here, the first body 110 of the embodiment includes a portion to be hold and forced from the user and another portion accommodating other members and being used for crimping the cable connector 200, and the second body 120 is mainly provided to drive the third, the fourth, and the fifth crimping bodies and the moving assembly 160 while being forced by the user.

In addition, the first linking body 130 is a toggle joint couples including components 131 and 132, and the first end E1 (only labeled on the component 131 as an example) of the first linking body 130 is pivoted to the second body 120 through the pivoting component P5. The second linking body 140 is a toggle joint couples including components 141 and 142, and the third end E3. (only labeled on the component 141 as an example) of the second linking body 140 is pivoted to the handle 114 of the first body 110 through a first pivoting shaft P1. Here, the toggle joint couples (components 131, 132) of the first linking body 130 is pivoted to two opposite sides of the third linking body 150, the toggle joint couples (components 141, 142) of the second linking body 140 is pivoted to two opposite sides of the first linking body 130 (simultaneously also at two opposite sides of the third linking body 150), and the first pivoting shaft P1 is located between the components 141, 142 of the second linking body 140. It is worth noting that the second end E2, the fourth end E4, and the sixth end E6 are pivoted coaxially with a pivoting component P3. Therefore, with regard only to the first linking body 130, the second linking body 140, the third linking body 150, the same can be viewed as performing a pivoting action with the pivoting component P3 as the pivoting axis (equivalent to the X-axis).

It shall also be noted that although the first linking body 130 and the second linking body 140 are illustrated in a manner of couples in the embodiment, in other unillustrated embodiments, the same can also respectively be an integrated single different from couples, the same being similarly capable of achieving the connecting effect of the toggle joint structure.

Figure 4:
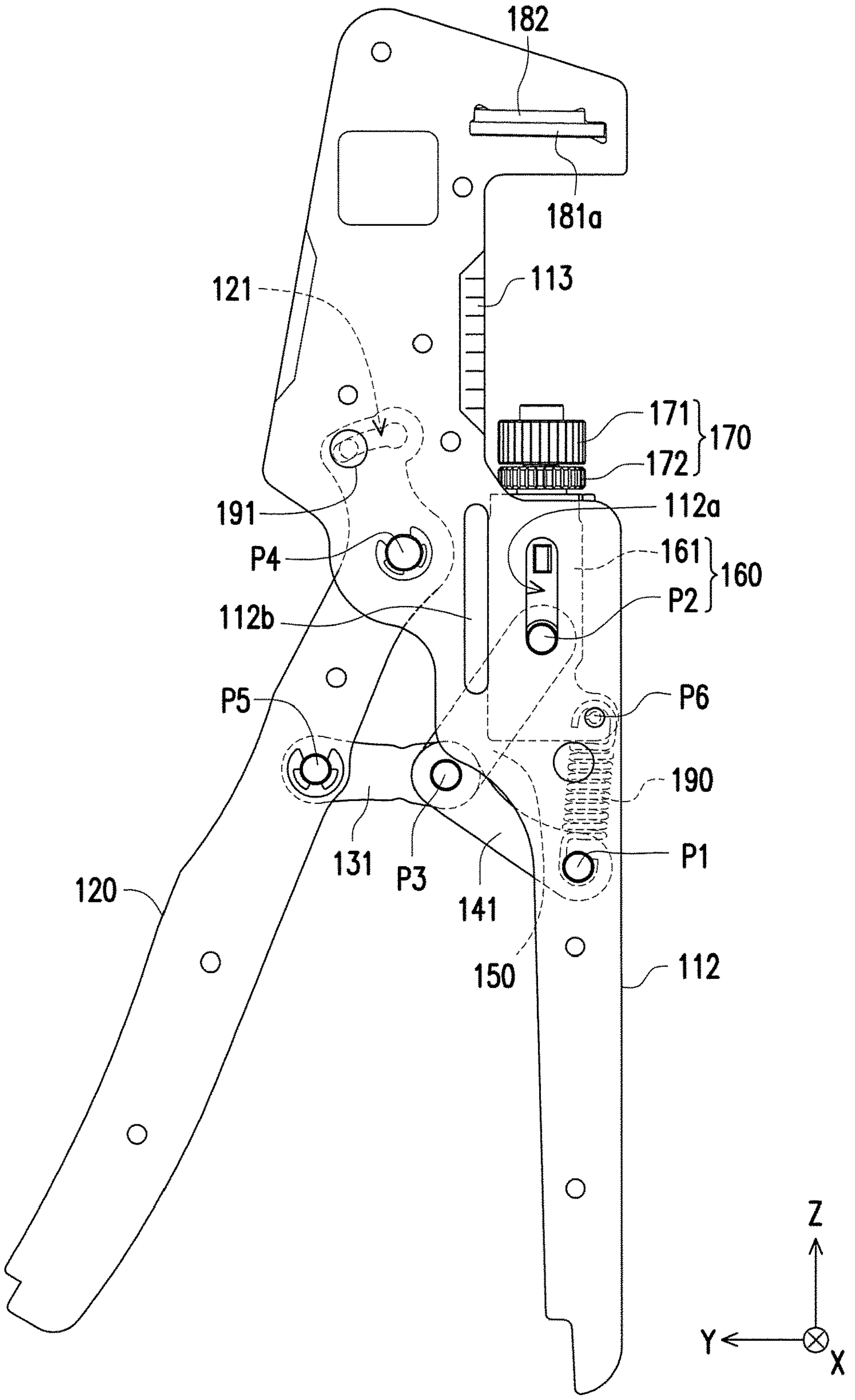
FIG. 4 and FIG. 5 are schematic diagrams of a portion of members of a crimping hand tool at different states, respectively.
Figure 5:
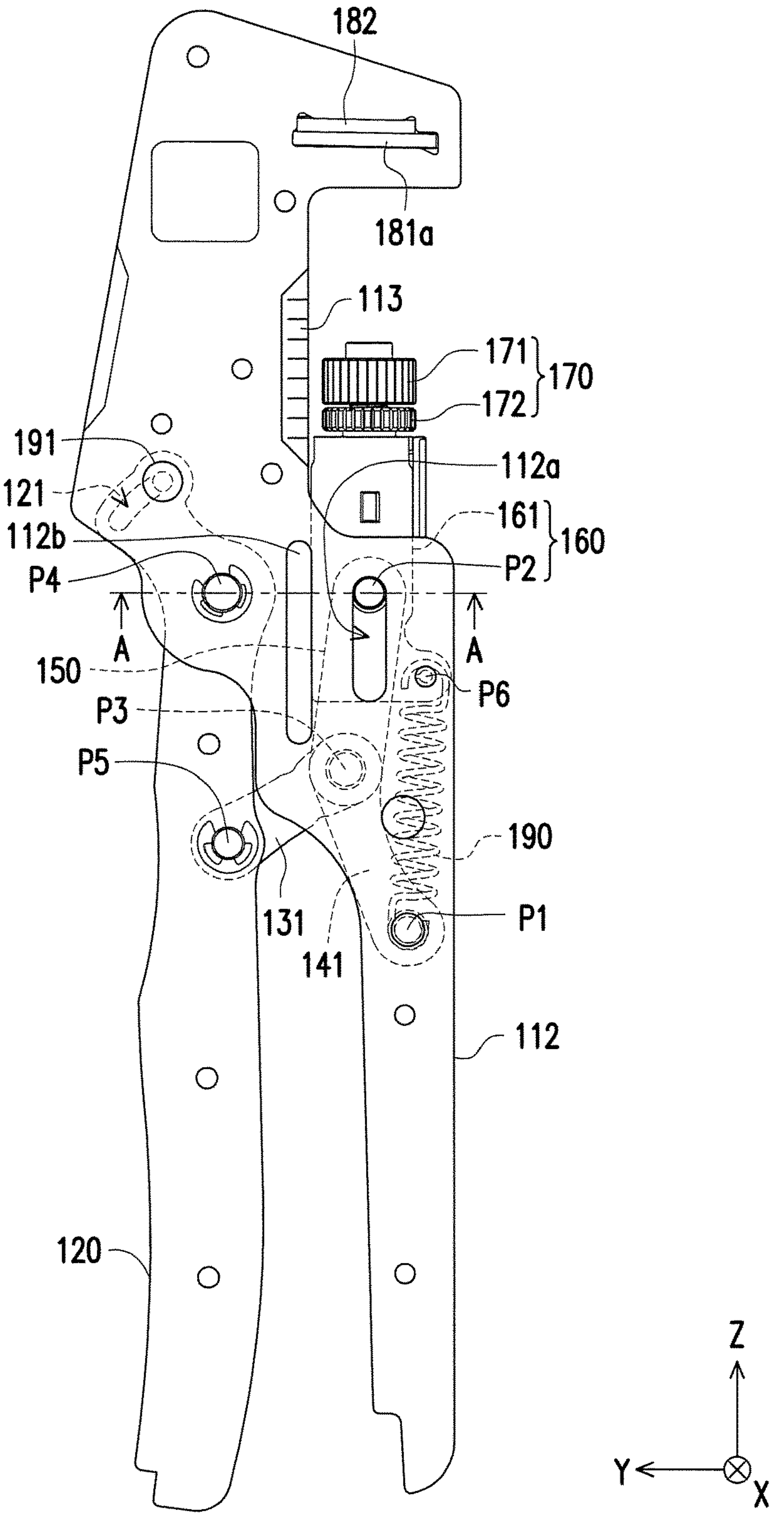
Figure 6:
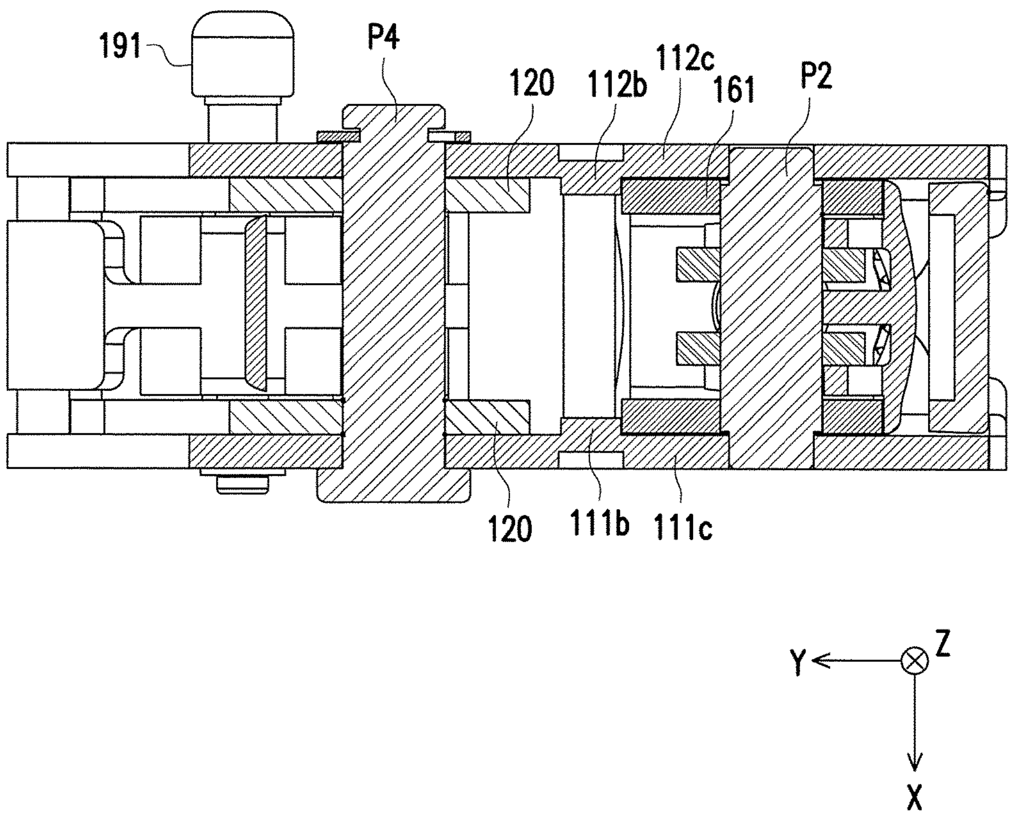
FIG. 6 is a cross-sectional view along a cross-sectional line A-A of FIG. 5.

FIG. 4 and FIG. 5 are schematic diagrams of a portion of members of a crimping hand tool at different states, respectively, wherein FIG. 4 corresponds to a state shown in FIG. 1, FIG. 5 corresponds to a state shown in FIG. 2, and a portion of members are omitted to facilitate identification. FIG. 6 is a cross-sectional view along a cross-sectional line A-A of FIG. 5. Referring to FIG. 3 to FIG. 6 at the same time, the moving assembly 160 of the embodiment includes a main body 161 and a second pivoting shaft P2, wherein the main body 161 has a groove, and the third linking body 150 is also a type of toggle joint couples structure, the fifth end E5 thereof being pivoted to an inside of the groove of the main body 161 through a pivoting component P6. The side plates 111, 112 of the first body 110 respectively have expanding holes 111*a*, 112*a*. After the second pivoting shaft P2 passes through to the inside of the groove of the main body 161, the two opposite ends thereof are then slidably pivoted to the expanding holes 111*a*, 112*a*. Here, the expanding holes 111*a*, 112*a* respectively extend along the Z-axis, thereby allowing the main body 161 to move along the Z-axis, such that the expanding holes 111*a*, 112*a* can be viewed as guiding structures of the first body 110 used for guiding the moving assembly 160.

Furthermore, the side plates 111, 112 respectively further have protruding blocks 111*b*, 112*b* extending along the Z-axis and being opposite to each other as the side plates 111, 112 and the base 113 are mutually assembled. The main body 161 of the moving assembly 160 bears on top of the protruding blocks 111*b*, 112*b* and moves along the Z-axis accordingly. Therefore, the protruding blocks 111*b*, 112*b* can also be viewed as guiding structures of the first body 110 used for guiding the moving assembly 160. In addition, as shown in FIG. 6, with regard to the main body 161 of the moving assembly 160, the side plates 111, 112 simultaneously form stage structures 111*c*, 112*c* because of the protruding blocks 111*b*, 112*b*. Therefore, the main body 161 leaning against the protruding blocks 111*b*, 112*b* in the Y-axis, a use of the main body 161 bearing along the X-axis and the Y-axis and the same being guided to slide along the Z-axis because of the stage structures 111*c*, 112*c* is also provided. Accordingly, the stage structures 111*c*, 112*c* can also be viewed as guiding structures of the first body 110 used for guiding the moving assembly 160.

In another aspect, referring again to FIG. 1 to FIG. 3, the crimping assembly 170 includes a crimping head 171 and a nut 172, wherein the crimping head 171 has a crimping portion and a screw, the crimping portion being used for abutting against the fixing portion 224 of the coaxial terminal 220, the screw being used for locking in the main body 161 of the moving assembly 160. The nut 172 is movably sleeved to the screw and located between the crimping portion and the moving assembly 160. The nut 172 is used for adjusting a distance of the crimping portion relative to the moving assembly 160 to adapt to the coaxial terminal 220 of different lengths.

Referring to FIG. 4 and FIG. 5 at the same time, based on the member configuration above, after placing the coaxial cable 210 and the coaxial terminal 220 together into the crimping space 113*a* as in FIG. 1, the user applies force to the first body 110 and the second body 120, so as to drive the first linking body 130, the second linking body 140 and the third linking body 150 to pivot with the pivoting component P3. In the process of FIG. 4 to FIG. 5, the first linking body 130 rotates in a counter-clockwise direction, the second linking body 140 rotates in a clockwise direction, and the third linking body 150 rotates in a counter-clockwise direction. The rotating actions thus push and move the moving assembly 160 upward, such that the crimping assembly 170 disposed thereon pushes the fixing portion 224 of the coaxial terminal 220 upward.

Referring again to FIG. 1 to FIG. 3, the crimping hand tool 100 further includes a gripping stopper 180 disposed at the crimping space 113*a* of the base 113. The gripping stopper 180 and the crimping assembly 170 are located at two opposite sides of the crimping space 113*a* along the Z-axis. The gripping portion 222 of the coaxial terminal 220 is used for being gripped and stopped at the gripping stopper 180, such that the fixing portion 224 of the coaxial terminal 220 abuts on the crimping assembly 170. The crimping assembly 170 is driven by the moving assembly 160 to crimp a portion of the gripping portion 222 into the fixing portion 224 along the Z-axis, such that the gripping portion 222 grips and fixes one end of the coaxial cable 210 in the fixing portion 224.

More specifically, the gripping stopper 180 includes a stopping portion 182, a pair of components 181*a*, 181*b*, and a return spring 183. The components 181*a*, 181*b* are assembled at the stopping portion 182 to be opened or closed. In the state shown in FIG. 1, the gripping portion 222 of the coaxial terminal 220 is used for being gripped between the components 181*a*, 181*b*, and an upper edge of the gripping portion 222 abuts on the stopping portion 182. The return spring 183 connects between the components 181*a*, 181*b*, and the return spring 183 constantly drives the components 181*a*, 181*b* to be closed to grip the gripping portion 222 of the coaxial terminal 220. Therefore, in the crimping process, the stopping portion 182 provides the stopping effect preventing the gripping portion 222 of the coaxial terminal 220 from being pushed upward, such that when the crimping head 171 pushes the fixing portion 224 upward, the fixing portion 224 and the gripping portion 222 are facilitated to produce relative movement along the Z-axis. In the embodiment, the stopping portion 182 has pivoting holes h1 and h2, the component 181*a* has a pivoting hole h4, and the component 181*b* has a pivoting hole h3, wherein the pivoting hole h1 is pivoted to and coincided with the pivoting hole h3 via a pivoting member (a pivoting rod in the base 113 which is not depicted here), and the pivoting hole h2 is pivoted to and coincided with the pivoting hole h4 via another pivoting member (another pivoting rod in the base 113 which is not depicted here, either).

In another aspect, the crimping hand tool 100 of the embodiment further includes a return spring 190 connecting between the moving assembly 160 (the pivoting component P6) and the pivoting component P1. As shown in FIG. 4 and FIG. 5, the return spring 190 constantly drives the first body 110 and the second body 120 to be opened relatively. That is, in the closed state as shown in FIG. 5, the return spring 190 is stretched because the main body 161 of the moving assembly 160 is moving upward (positive Z-axis direction) to perform a crimping action. Therefore, after the user releases the crimping force, the return spring 190 pulls the main body 161 back to the position as shown in FIG. 4 through an restoring force thereof, and simultaneously drives the first body 110 and the second body 120 to be opened relatively so as to restore the state as shown in FIG. 4.

Referring again to FIG. 3 to FIG. 5, in the embodiment, the second body 120 has a locking groove 121, and the locking groove 121 is an expanding hole (expanding slot) having different inner diameters. As shown in FIG. 4 and FIG. 5, an expanding direction of the locking groove 121 is located on the Y-Z plane. In contrast, the locking shaft 191 passes through the locking groove 121 along the X-axis, and the locking shaft 191 also has an axial portion having different outer diameters. In other words, the locking shaft 191 movably passes through the first body 110 along the X-axis, such that the outer diameters thereof and the different inner diameters of the locking groove 121 are matched to each other, so that the first body 110 and the second body 120 are able to be interfered and jammed. Accordingly, when the locking shaft 191 moves in the locking groove 121 along with the relative movement of the first body 110 and the second body 120, as the first body 110 and the second body 120 open or close relatively, the locking shaft 191 is enabled to interfere at the locking groove 121, so as to maintain the first body 110 and the second body 120 at an opened state or a closed state. An illustration of the embodiment is, in the state as shown in FIG. 5, the locking shaft 191 interfering at the locking groove 121 at the right side of the drawing.

In summary of the above, in the above embodiments of the disclosure, the crimping hand tool, through the first linking body, the second linking body, and the third linking body which are pivoted coaxially, in coordination with corresponding pivoting relationship of the first body and the second body, thus forms a toggle joint linkage structure, thereby enabling the moving assembly connected to the third linking body to be driven due to the toggle joint linkage structure, so as to enable the crimping assembly disposed on the moving assembly to be driven to perform the crimping action, facilitating the coaxial cable and the coaxial terminal to be crimped together.

In addition, besides serving as a toggle joint linkage structure, the first body also provides the use of accommodating other members, wherein the first body, through the guiding structure, enables the moving assembly disposed thereon to convert a pivot motion into a slipping action in a single axial direction. The single axial direction is a crimping axial direction of the coaxial cable and the coaxial terminal.

Furthermore, the first body further includes the gripping stopper, disposed at the crimping space of the first body, used for gripping and stopping the gripping portion of the coaxial terminal to facilitate the crimping action to be performed, simultaneously preventing the coaxial cable or the coaxial terminal from producing swing.

In another aspect, the crimping hand tool further includes the locking shaft movably passing through the first body and the second body along another axial direction, simultaneously also passing through the locking groove located at an end portion of the second body. Through the coordination of the axial portion of the locking shaft having different outer diameters and the locking groove having different inner diameters, the first body and the second body are accordingly enabled to maintain the opened or closed state thereof.

Although the disclosure has been described with reference to the above embodiments, it will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A crimping hand tool is configured for crimping a coaxial cable to a coaxial terminal, the crimping hand tool comprising:

a first body;

a second body pivoted to the first body;

a first linking body having a first end and a second end, the first end being pivoted to the second body;

a second linking body having a third end and a fourth end, the third end being pivoted to the first body;

a third linking body having a fifth end and a sixth end, wherein the second end, the fourth end, and the sixth end are pivoted coaxially;

a moving assembly pivoted to the fifth end, the moving assembly being slidably coupled to the first body along an axial direction; and a crimping assembly disposed on the moving assembly to move along with the moving assembly, wherein the first body and the second body being forced and pivoted to each other, and slide the moving assembly along the axial direction through the first linking body, the second linking body, and the third linking body, such that the moving assembly drives the crimping assembly to crimp the coaxial cable and the coaxial terminal together, wherein the first body comprises:

a base;

a pair of side plates assembled at two opposite sides of the base; and a handle assembled to the pair of side plates and forming an accommodating space to accommodate at least a portion of the first linking body, at least a portion of the second linking body, at least a portion of the third linking body, and at least a portion of the moving assembly.

2. The crimping hand tool according to claim 1, wherein the first linking body and the second linking body are respectively a toggle joint structure, the toggle joint structure of the first linking body being pivoted to the third linking body, the toggle joint structure of the second linking body being pivoted to the first linking body.

3. The crimping hand tool according to claim 2, further comprising:

a first pivoting shaft pivoted to the second linking body and the first body, and the first pivoting shaft is located in the toggle joint structure of the second linking body; and a first return spring connected between the moving assembly and the first pivoting shaft, the first return spring constantly driving the first body and the second body to be opened.

4. The crimping hand tool according to claim 1, further comprising:

a gripping stopper disposed at the base, the base having a crimping space, the gripping stopper and the crimping assembly being located at two opposite sides of the crimping space along the axial direction, a gripping portion of the coaxial terminal being gripped and stopped at the gripping stopper, such that a fixing portion of the coaxial terminal abuts on the crimping assembly, the crimping assembly being driven by the moving assembly to crimp a portion of the gripping portion into the fixing portion along the axial direction, such that the gripping portion grips and fixes one end of the coaxial cable in the fixing portion.

5. The crimping hand tool according to claim 4, wherein the gripping stopper comprises:

a stopping portion;

a pair of components assembled on the stopping portion and configured to be opened or closed, the gripping portion being gripped between the pair of components and abutted against the stopping portion; and a second return spring connected between the pair of components, the second return spring constantly driving the pair of components to be closed to grip the gripping portion.

6. The crimping hand tool according to claim 1, wherein the pair of side plates respectively has an expanding hole, the moving assembly comprises a main body and a second pivoting shaft passing through the main body, and the two opposite ends thereof are slidably pivoted to the pair of expanding holes, an extending direction of each of the expanding holes being consistent with the axial direction.

7. The crimping hand tool according to claim 6, wherein the pair of side plates respectively further has a protruding block, and the protruding blocks are opposite each other as the pair of side plates are assembled at the base, the main body movably bearing on the pair of protruding blocks along the axial direction.

8. The crimping hand tool according to claim 1, wherein the crimping assembly comprises:

a crimping head having a crimping portion and a screw, the screw being configured for locking in the moving assembly; and a nut movably sleeved to the screw and located between the crimping portion and the moving assembly, the nut being configured for adjusting a distance of the crimping portion relative to the moving assembly.

9. The crimping hand tool according to claim 1, wherein the second body has a locking groove, the locking groove having different inner diameters, while the crimping hand tool further has a locking shaft movably passing through the first body, the locking shaft having different outer diameters, and the locking shaft moves in the locking groove along with the first body and the second body, as the first body and the second body open or close relatively, the locking shaft is enabled to be interfered with the locking groove to maintain an opened state or a closed state of the first body and the second body.

* * * * *